(12) United States Patent
Higashi et al.

(10) Patent No.: US 6,169,144 B1
(45) Date of Patent: Jan. 2, 2001

(54) INJECTION-MOLDED PRODUCT OF PROPYLENE BASED RESIN COMPOSITION

(75) Inventors: Kenichi Higashi; Masao Toyoda; Susumu Kanzaki, all of Ichihara (JP)

(73) Assignee: Sumitomo Chemical Company, Limited, Osaka (JP)

(*) Notice: Under 35 U.S.C. 154(b), the term of this patent shall be extended for 0 days.

(21) Appl. No.: 09/335,052

(22) Filed: Jun. 16, 1999

(30) Foreign Application Priority Data

Jun. 18, 1998 (JP) .................................................. 10-171255

(51) Int. Cl.[7] .............................. C08L 53/02; C08L 55/00
(52) U.S. Cl. ................................ 525/88; 525/89; 525/97; 525/98; 524/451; 524/425
(58) Field of Search ................................. 525/88, 89, 97, 525/98; 524/451, 425

(56) References Cited

U.S. PATENT DOCUMENTS

| | | | |
|---|---|---|---|
| 5,624,991 | * 4/1997 | Harada et al. | 524/451 |
| 5,824,759 | * 10/1998 | Watanabe et al. | 526/348 |

FOREIGN PATENT DOCUMENTS

| | | |
|---|---|---|
| 62-45638 | 2/1987 | (JP) . |
| 62-91545 | 4/1987 | (JP) . |
| 4-156322 | 5/1992 | (JP) . |
| 6-339944 | 12/1994 | (JP) . |
| 9-183918 | 7/1997 | (JP) . |

\* cited by examiner

*Primary Examiner*—Robert Dawson
*Assistant Examiner*—Kuo-Liang Peng
(74) *Attorney, Agent, or Firm*—Birch, Stewart, Kolasch & Birch, LLP

(57) ABSTRACT

There is disclosed:

an injection-molded product containing a propylene based resin composition having a melt viscosity of not more than about 32 Pa·s measured at a shear rate of 2,432 $s^{-1}$ and at a temperature of 240° C. and a swelling ratio of from about 1.3 to 2.0 measured at a shear rate of 2,432 $s^{-1}$ and at a temperature of 240° C., which composition comprises:

(i) about 50 to 70% by weight of a propylene based resin;
(ii) about 15 to 30% by weight of a thermoplastic elastomer; and
(iii) about 10 to 30% by weight of an inorganic filler.

7 Claims, 1 Drawing Sheet

INJECTION-MOLDED PRODUCT OF PROPYLENE BASED RESIN COMPOSITION

FIELD OF THE INVENTION

The present invention relates to an injection-molded product of a propylene based resin composition. The injection-molded product is satisfactory in its weld appearance and flow mark appearance and therefore may be suitably used for a car part, an electronic and electric instrument part and a machinery part.

BACKGROUND OF THE INVENTION

Propylene based resin compositions have been extensively used for molding car parts, electronic and electric instrument parts and machinery parts by an injection molding method. In recent years, these kinds of parts have been required to be higher in their level of weld appearance and flow mark appearance as well as in their impact resistance, rigidity and resistance to heat deformation.

In molding a part by an injection molding method, it is generally known that at least two confluent portions at which flows of molten resin run together are found in a mold, and weld marks appear at the confluent portions in products molded therewith. Thus, conventional propylene based resin compositions are satisfactory in their mechanical properties such as impact resistance and rigidity, but are not satisfactory in their weld appearance.

In order to improve the weld appearance of molded products, for example, the following methods 1 to 4 have been previously proposed.

1. A method wherein a composition comprising (i)a propylene based resin, (ii)a fibrous reinforcing agent having a specific form, (iii)talc and (iv)calcium carbonate is used (JP-A-62-91545).

2. A method wherein a composition comprising (i) a resin such as a polypropylene resin or a polystyrene resin and (ii)a specific pigment is used (JP-A-9-183918).

3. A method wherein a confluent portion in a mold is improved (JP-A-4-156322).

4. A method wherein a composition comprising (i)a propylene based resin containing a polymer component derived from ethylene monomer, (ii)a propylene based resin obtained by further treating the above-mentioned propylene based resin with an organic peroxide, and (iii)an inorganic filler is used (JP-A-62-45638).

Although the above methods 1 to 4 exhibit an effect of improving the weld appearance, they leave following problems 1 to 3.

1. They are limited in their effects of improving the physical properties of the molded product.

2. Molds and injection molding machines to be used are restricted to specific ones in kind.

3. They are too high in costs to be used extensively.

In addition, in order to improve an undesirable appearance of "heaping" on the weldline, it has been proposed that a propylene based resin composition having a specific proportion of a swelling ratio measured at a higher shear rate and at a specific high temperature to a swelling ratio measured at a lower shear rate and at that temperature be used (JP-A-6-339944).

However, the method proposed in JP-A-6-33944 also leaves problems such that when the confluent portion is located near a gate of a mold, or when the injection molding is completed within a relatively short period of time, or when the injection molding is carried out using a propylene based resin composition having a high fluidity, not heaping but instead "grooving" on the weldline appears frequently, and such a weld cannot be improved to a proper degree of satisfaction.

Each of the references referred to above is incorporated herein by reference in its entirety.

SUMMARY OF THE INVENTION

An object of the present invention is to provide an injection-molded product of a propylene based resin composition, which product is satisfactory in its weld appearance and flow mark appearance.

The present inventors have undertaken extensive studies to develop an injection-molded product containing a propylene based resin composition, which product is satisfactory particularly in its weld appearance and flow mark appearance. As a result, it has been found that a propylene based resin composition having a specific melt viscosity and swelling ratio can give an injection-molded product satisfactory in its weld appearance and flow mark appearance, and thereby the present invention has been obtained.

The present invention provides an injection-molded product containing a propylene based resin composition having a melt viscosity of not more than about 32 Pa·s measured at a shear rate of 2,432 $s^{-1}$ and at a temperature of 240° C. and a swelling ratio of from about 1.3 to 2.0 measured at a shear rate of 2,432 $s^{-1}$ and at a temperature of 240° C., which composition comprises:

(i) about 50 to 70% by weight of a propylene based resin;

(ii) about 15 to 30% by weight of a thermoplastic elastomer; and (iii) about 10 to 30% by weight of an inorganic filler.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In FIG. 1, numerals 1 and 2 denote a gate 1 and a gate 2, respectively, and a numeral 3 denotes a weld.

In FIG. 2, a numeral 11 denotes a gate and a numeral 12 denotes a flow mark.

DETAILED DESCRIPTION OF THE INVENTION

Figure 1:
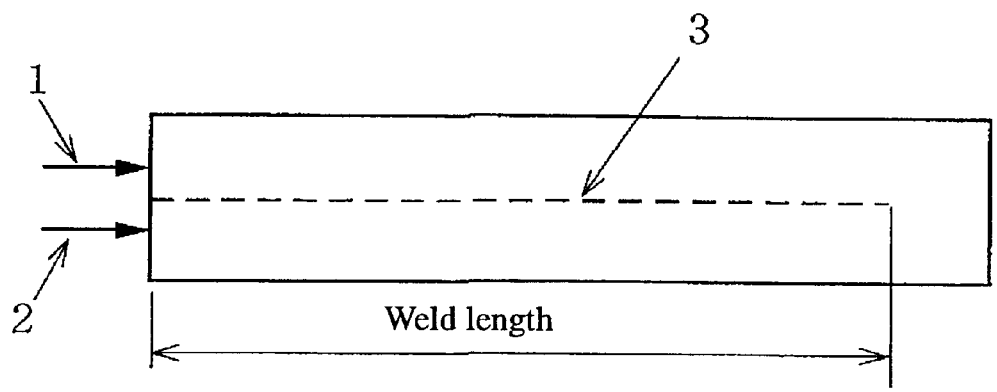
FIG. 1, which is given by way of illustration only, and thus is not limitative of the present invention, shows a plane view of the flat board like injection-molded product formed for evaluating the weld appearance.

The propylene based resin used in the present invention is an injection-moldable resin having a repeating unit derived from propylene as a main unit, and contains, for example, a propylene homopolymer, a random or block copolymer of propylene with an α-olefin such as a copolymer of propylene with ethylene, or a mixture of these (co)polymers. Of these, a block copolymer of propylene with ethylene is preferred.

Examples of the α-olefin are ethylene and those having 4 to 8 carbon atoms such as butene-1, hexene-1 and octene-1.

The thermoplastic elastomer used in the present invention contains, for example, an ethylene-α-olefin copolymer rubber such as an ethylene-propylene copolymer rubber, an ethylene-propylene-conjugated diene copolymer rubber, a styrene-butadiene-styrene block copolymer rubber, a styrene-isoprene-styrene block copolymer rubber, a styrene-ethylene-butylene-styrene block copolymer rubber or a mixture of these copolymer rubbers. Of these, it is preferred to use a styrene-ethylene-butylene styrene block copolymer rubber or an ethylene-propylene-conjugated diene copolymer rubber.

The inorganic filler used in the present invention contains, for example, talc, calcium carbonate, mica, barium sulfate, calcium silicate, clay, magnesium carbonate, alumina, silica, a glass fiber reinforcing agent or a mixture of these fillers. Of these, talc is preferred.

The propylene based resin composition used in the present invention comprises about 50 to 70% by weight, preferably about 55 to 65% by weight of the propylene based resin, about 15 to 30% by weight, preferably about 20 to 25% by weight of the thermoplastic elastomer, and about 10 to 30% by weight, preferably about 15 to 25% by weight of the inorganic filler, provided that the sum of respective components is preferably assigned as 100% by weight— although the instant invention is not limited thereto. When the components are out of the ranges specified above, the mechanical properties of the injection-molded product obtained are deteriorated, so that the balance between the mechanical properties and the appearances, i.e. a weld appearance and a flow mark appearance, becomes unsatisfactory.

The propylene based resin composition used in the present invention is not more than about 32 Pa·s, preferably from about 20 to 32 Pa·s, in its melt viscosity measured at a shear rate of 2,432 $s^{-1}$ and at a temperature of 240° C. When the melt viscosity exceeds about 32 Pa·s, the flow mark appearance of the injection-molded product obtained becomes inferior, even if the swelling ratio (SR) measured at a shear rate of 2,432 $s^{-1}$ and at a temperature of 240° C. is controlled within the range of from about 1.3 to 2.0.

The propylene based resin composition used in the present invention is from about 1.3 to 2.0, preferably from about 1.4 to 1.6, in its swelling ratio measured at a shear rate of 2,432 $s^{-1}$ and at a temperature of 240° C. When the swelling ratio is lower than about 1.3, the flow mark appearance of the injection-molded product obtained becomes inferior, even if its melt viscosity is controlled below the value specified above, and when the swelling ratio exceeds about 2.0, the weld appearance of the injection-molded product obtained becomes inferior, even if its melt viscosity is controlled below the value specified above.

A method for producing a propylene based resin composition used in the present invention is not particularly limited. Usually, the composition can be produced by dry-blending the predetermined amounts of respective components in the lump and then melt-kneading the resulting blend, or by quantitatively feeding the components to a melt kneading apparatus and then melt-kneading them.

If desired, the propylene based resin composition used in the present invention may be utilized in combination with additives such as, for example, antioxidants, ultraviolet ray absorbers, anti-static agents, lubricants, pigments, flame retardants, nucleating agents, dispersing agents or plasticizers, in such a way that the objects and effects of the present invention are not impaired.

The injection-molded product in accordance with the present invention can be produced by molding the propylene based resin composition mentioned above according to an injection molding method. In the specification of the present invention, the injection molding method means an injection compression molding method or an injection press molding method besides a conventional injection molding method.

According to the present invention, an injection-molded product, which is satisfactory in its weld appearance and flow mark appearance, can be provided by using a specific propylene based resin composition. The molded product can be applied for, for example, interior or exterior car parts such as a bumper, an instrumental panel, a fender, a trim, a door panel, a wheel cover, a side protector, a console box and a column cover, two-wheeled vehicle parts such as a cowling and a muffler, or weld forming molded products usable for various purposes.

EXAMPLES

The present invention is illustrated in more detail with reference to the following Examples, which are only illustrative and not to be construed to limit the scope of the present invention.

The injection molding machine, the mold, a shape of the molded product and evaluation methods used in the Examples were as follows.

1. Melt Viscosity and Swelling Ratio

The melt viscosity and the swelling ratio were measured using Capirograph 1B, a registered trademark of a measuring machine manufactured by TOYOSEIKI SEISAKUSHO Co., Ltd., under conditions of an orifice length/orifice diameter ratio of 40/1; a shear rate of 2,432 $s^{-1}$; and a temperature of 240° C. which is a temperature in the vicinity of resin temperature when the weld portion is formed.

2. Weld Appearance

Using NEOMAT 515/150, a trade mark of an injection molding machine manufactured by Sumitomo Heavy Industries, Ltd., under a mold clamping force of 150 tons, and a mold of 100 mm×400 mm×2.5 mm(thick) having paralleled two gates, the molding was carried out at a molding temperature of 240° C. to obtain a flat board like injection-molded product for evaluating the weld appearance as shown in FIG. 1. In FIG. 1, numerals 1 and 2 indicate two gates, and numeral 3 indicates a weld.

The weld appearance of the injection-molded product obtained was judged on the basis of a weld length and a visual observation. With respect to the weld length, the weld portion was observed at 250 magnifications using a surface condition-measuring microscope manufactured by Keyence Co., Ltd., and a distance from the gate portion in the injection-molded product to a position at which no grooving weld appeared was assigned as the weld length.

Judgement by the visual observation was carried out according to the following criteria.

◯: Almost no weld was observed from the central portion of the injection molded-product (a position of 200 mm from the gate) to the end portion (a position of 400 mm from the gate).

X: Weld was clearly observed from the gate portion of the injection-molded product to the end portion.

3. Flow Mark Appearance

Figure 2:
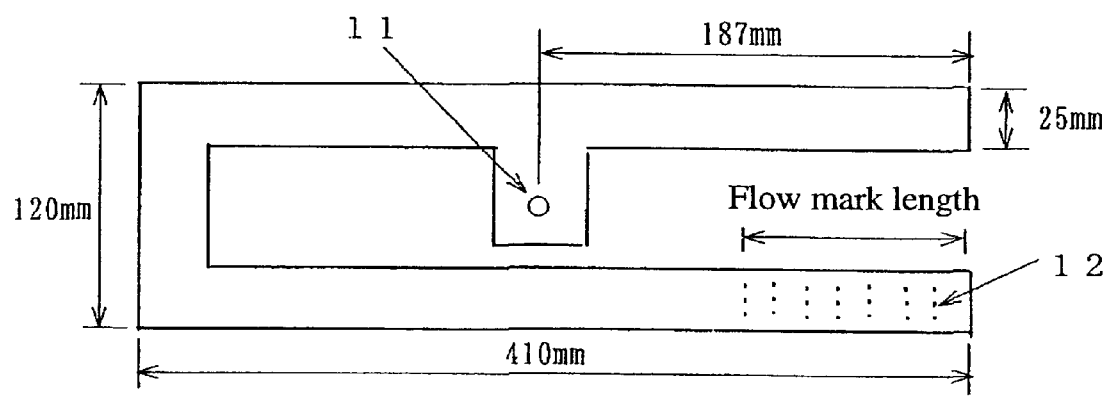
FIG. 2, which is also given by way of illustration only, and thus is not limitative of the present invention, shows a plane view of the injection-molded product formed for evaluating the flow mark appearance.

Using FS160, an injection molding machine manufactured by Nissei Plastic Industrial Co., Ltd., under a mold clamping force of 160 tons, the molding was carried out at a molding temperature of 240° C. to obtain an injection-molded product having a board thickness of 2.0 mm and a shape as shown in FIG. 2 for evaluating the flow mark appearance. In FIG. 2, numerals 11 and 12 indicate a gate and a flow mark, respectively.

In evaluating the flow mark appearance, a distance of flow mark visually observed was measured, and assigned as a flow mark length.

Judgement by the visual observation was carried out according to the following criteria.

◯: No flow mark was observed or it was very difficult to observe a flow mark.

X: Flow mark was clearly observed.

Example 1

Using TEX-44, a registered trade mark of a twin screw kneading machine manufactured by The Japan Steel Works, Ltd., 58% by weight of a propylene-ethylene block copolymer(content of repeating unit derived from ethylene= 6.6% by weight, MI=68.9 g/10 min.), 22% by weight of Kraton G1657, a trade mark of a styrene-ethylene-butylene-styrene block copolymer rubber produced by Shell Co., and 20% by weight of talc having an average particle size of not higher than 3 μm were melt-kneaded and then pelletized.

Using the injection molding machines mentioned above, the pellet of propylene based resin composition was molded to obtain the injection molded-products as shown in FIG. 1 and FIG. 2, respectively. The evaluation results of the molded products were as shown in Table 1.

Example 2

In a manner similar to that of Example 1, 58% by weight of a propylene-ethylene block copolymer(the same as that used in the Example 1), 3.5% by weight of EP57P, a trade mark of an ethylene-propylene-ethylidenenorbornene copolymer rubber produced by Japan Synthetic Rubber Co., Ltd., 18.5% by weight of Kraton G1657, a trade mark of a styrene-ethylene-butylene-styrene block copolymer rubber produced by Shell Co., and 20% by weight of talc having an average particle size of not higher than 3 μm were pelletized, and the resulting pellet was injection-molded to obtain the injection-molded products as shown in FIG. 1 and FIG. 2, respectively. The evaluation results of the molded products were as shown in Table 1.

Example 3

In a manner similar to that of Example 1, 63% by weight of a propylene-ethylene block copolymer(content of repeating unit derived from ethylene=4.0% by weight, MI=128.9 g/10 min.), 13.5% by weight of Kraton G1657, a trade mark of a styrene-ethylene-butylene-styrene block copolymer rubber produced by Shell Co., 3.5% by weight of Kraton G1650, a trade mark of a styrene-ethylene-butylene-styrene block copolymer rubber produced by Shell Co., and 20% by weight of talc having an average particle size of not higher than 3 μm were pelletized, and the resulting pellet was injection-molded to obtain the injection-molded products as shown in FIG. 1 and FIG. 2, respectively. The evaluation results of the molded products were as shown in Table 1.

TABLE 1

|  | Example 1 | Example 2 | Example 3 |
| --- | --- | --- | --- |
| Propylene based resin (wt %) | 58 | 58 | 63 |
| Thermoplastic elastomer (wt %) | 22 | 22 | 17 |
| Inorganic filler (wt %) | 20 | 20 | 20 |
| Melt viscosity (Pa · s) | 27 | 29 | 26 |

TABLE 1-continued

|  | Example 1 | Example 2 | Example 3 |
| --- | --- | --- | --- |
| Swelling ratio | 1.46 | 1.47 | 1.42 |
| Weld length (mm) | 150 | 180 | 170 |
| Visual judgment of weld | ◯ | ◯ | ◯ |
| Flow mark length (mm) | 0 | 0 | 0 |
| Visual judgment of flow mark | ◯ | ◯ | ◯ |

What is claimed is:

1. An injection-molded product containing a propylene based resin composition having a melt viscosity of not more than about 32 Pa·s measured at a share rate of 2,432 s$^{-1}$ and at a temperature of 240° C. and a swelling ratio of from about 1.3 to 2.0 measured at a shear rate of 2,432 s$^{-1}$ and at a temperature of 240° C., which composition comprises:

(i) about 50 to 70% by weight of a propylene based resin, comprising a propylene homopolymer, a block copolymer of propylene with ethylene, or a mixture thereof, wherein the block copolymer has a content of a repeating unit derived from ethylene of about 3 to 7% by weight, and has a content of a repeating unit derived from propylene of about 93 to 97% by weight;

(ii) about 15 to 30% by weight of a thermoplastic elastomer; and (iii) about 10 to 30% by weight of an inorganic filler.

2. The injection-molded product according to claim 1, wherein the melt viscosity of the propylene based resin composition is from about 20 to 32 Pa·s measured at a shear rate of 2,432 s$^{-1}$ and at a temperature of 240° C.

3. The injection-molded product according to claim 1, wherein the swelling ratio of the propylene based resin composition is from about 1.4 to 1.6 measured at a shear rate of 2,432 s$^{-1}$ and at a temperature of 240° C.

4. The injection-molded product according to claim 1, wherein the propylene based resin contains a block copolymer of propylene with ethylene.

5. The injection-molded product according to claim 1, wherein the thermoplastic elastomer contains a styrene-ethylene-butylene-styrene block copolymer rubber or an ethylene-propylene-conjugated diene copolymer rubber.

6. The injection-molded product according to claim 1, wherein the inorganic filler contains talc.

7. The injection-molded product according to claim 1, wherein the propylene based resin composition comprises:

(i) about 55 to 65% by weight of a propylene based resin;

(ii) about 20 to 25% by weight of a thermoplastic elastomer; and (iii) about 15 to 25% by weight of an inorganic filler.

* * * * *